US008881279B2

(12) United States Patent
Gregg

(10) Patent No.: US 8,881,279 B2
(45) Date of Patent: Nov. 4, 2014

(54) SYSTEMS AND METHODS FOR ZONE-BASED INTRUSION DETECTION

(71) Applicant: Brendan Gregg, Walnut Creek, CA (US)

(72) Inventor: Brendan Gregg, Walnut Creek, CA (US)

(73) Assignee: Joyent, Inc., San Francisco, CA (US)

( * ) Notice: Subject to any disclaimer, the term of this patent is extended or adjusted under 35 U.S.C. 154(b) by 0 days.

(21) Appl. No.: 13/830,913

(22) Filed: Mar. 14, 2013

(65) Prior Publication Data

US 2014/0283053 A1 Sep. 18, 2014

(51) Int. Cl.
*G06F 12/14* (2006.01)
*H04L 29/06* (2006.01)

(52) U.S. Cl.
CPC .................................. *H04L 63/1441* (2013.01)
USPC ................................. 726/23; 709/226; 718/1

(58) Field of Classification Search
USPC ...................................... 726/22–26; 713/188
See application file for complete search history.

(56) References Cited

U.S. PATENT DOCUMENTS 6,088,694 A 7/2000 Burns et al.
6,393,495 B1 5/2002 Flory et al.
6,553,391 B1 4/2003 Goldring et al.
6,901,594 B1 5/2005 Cain et al.
7,222,345 B2 5/2007 Gray et al.
7,265,754 B2 9/2007 Brauss
7,379,994 B2 5/2008 Collazo
7,437,730 B2 10/2008 Goyal
7,529,780 B1 5/2009 Braginsky et al.
7,581,219 B2 8/2009 Neiger et al.
7,603,671 B2 10/2009 Liu
7,640,547 B2 12/2009 Neiman et al.
7,685,148 B2 3/2010 Engquist et al.
7,774,457 B1 8/2010 Talwar et al.
7,814,465 B2 * 10/2010 Liu .............................. 717/126
7,849,111 B2 12/2010 Huffman et al.
7,899,901 B1 * 3/2011 Njemanze et al. ............ 709/224
7,904,540 B2 3/2011 Hadad et al.
7,917,599 B1 3/2011 Gopalan et al.
7,933,870 B1 4/2011 Webster
7,940,271 B2 5/2011 Wright et al.
8,006,079 B2 8/2011 Goodson et al.
8,010,498 B2 8/2011 Gounares et al.
8,141,090 B1 3/2012 Graupner et al.

(Continued)

FOREIGN PATENT DOCUMENTS

WO 2011/088224 7/2011
WO WO2012125143 9/2012
WO WO2012125144 9/2012

OTHER PUBLICATIONS

Bi et al. "Dynamic Provisioning Modeling for Virtualized Multi-tier Applications in Cloud Data Center". 2010 IEEE 3rd International Conference on Cloud Computing. pp. 370-377.

(Continued)

*Primary Examiner* — Amare F Tabor
(74) *Attorney, Agent, or Firm* — Carr & Ferrell LLP

(57) ABSTRACT

Systems and methods for zone-based intrusion detection are described herein. The system may comprise a multi-tenant system; a server communicatively coupled with the multi-tenant system; a zone-based intrusion detection module running on the server; a zone within the server, the zone being a tenant and including at least one process running on it; and a debugger module that examines the process in real-time.

28 Claims, 5 Drawing Sheets

300
320
Multi-Tenant System 305
System Memory 325
Tenant (Zone) 310A
Tenant (Zone) 310N
Computing Resource 330
Client Device 315

(56) References Cited

U.S. PATENT DOCUMENTS 8,181,182 B1 5/2012 Martin
8,244,559 B2 8/2012 Horvitz et al.
8,301,746 B2 10/2012 Head et al.
8,336,051 B2 12/2012 Gokulakannan
8,346,935 B2 1/2013 Mayo et al.
8,370,936 B2 * 2/2013 Zuk et al. ........................ 726/23
8,417,673 B2 4/2013 Stakutis et al.
8,417,746 B1 4/2013 Gillett, Jr. et al.
8,429,282 B1 4/2013 Ahuja et al.
8,434,081 B2 4/2013 Cervantes et al.
8,464,251 B2 6/2013 Sahita et al.
8,468,251 B1 6/2013 Pijewski et al.
8,547,379 B2 10/2013 Pacheco et al.
8,555,276 B2 10/2013 Hoffman et al.
8,631,131 B2 1/2014 Kenneth et al.
8,677,359 B1 3/2014 Cavage et al.
8,775,485 B1 7/2014 Cavage et al.
8,782,224 B2 7/2014 Pijewski et al.
8,789,050 B2 7/2014 Hoffman et al.
8,793,688 B1 7/2014 Mustacchi et al.
8,826,279 B1 9/2014 Pacheco et al.
2002/0069356 A1 * 6/2002 Kim ............................. 713/160
2002/0082856 A1 6/2002 Gray et al.
2002/0156767 A1 10/2002 Costa et al.
2002/0198995 A1 12/2002 Liu et al.
2003/0154112 A1 8/2003 Neiman et al.
2003/0163596 A1 8/2003 Halter et al.
2004/0088293 A1 5/2004 Daggett
2005/0097514 A1 5/2005 Nuss
2005/0108712 A1 5/2005 Goyal
2005/0188075 A1 8/2005 Dias et al.
2006/0107087 A1 5/2006 Sieroka et al.
2006/0153174 A1 7/2006 Towns-von Stauber et al.
2006/0218285 A1 9/2006 Talwar et al.
2006/0246879 A1 11/2006 Miller et al.
2006/0248294 A1 11/2006 Nedved et al.
2006/0294579 A1 * 12/2006 Khuti et al. ...................... 726/3
2007/0088703 A1 4/2007 Kasiolas et al.
2007/0118653 A1 5/2007 Bindal
2007/0168336 A1 7/2007 Ransil et al.
2007/0179955 A1 8/2007 Croft et al.
2007/0250838 A1 10/2007 Belady et al.
2007/0271570 A1 11/2007 Brown et al.
2008/0080396 A1 4/2008 Meijer et al.
2008/0103861 A1 5/2008 Zhong
2008/0155110 A1 6/2008 Morris
2009/0044188 A1 2/2009 Kanai et al.
2009/0077235 A1 3/2009 Podila
2009/0164990 A1 6/2009 Ben-Yehuda et al.
2009/0172051 A1 7/2009 Huffman et al.
2009/0193410 A1 7/2009 Arthursson et al.
2009/0216910 A1 8/2009 Duchesneau
2009/0259345 A1 10/2009 Kato et al.
2009/0260007 A1 10/2009 Beaty et al.
2009/0300210 A1 12/2009 Ferris
2010/0050172 A1 2/2010 Ferris
2010/0057913 A1 3/2010 Dehaan
2010/0106820 A1 4/2010 Gulati et al.
2010/0114825 A1 5/2010 Siddegowda
2010/0125845 A1 5/2010 Sugumar et al.
2010/0131324 A1 5/2010 Ferris
2010/0131854 A1 5/2010 Little
2010/0153958 A1 6/2010 Richards et al.
2010/0162259 A1 6/2010 Koh et al.
2010/0223383 A1 9/2010 Salevan et al.
2010/0223385 A1 9/2010 Gulley et al.
2010/0228936 A1 9/2010 Wright et al.
2010/0235632 A1 9/2010 Iyengar et al.
2010/0250744 A1 9/2010 Hadad et al.
2010/0262752 A1 10/2010 Davis et al.
2010/0268764 A1 10/2010 Wee et al.
2010/0299313 A1 11/2010 Orsini et al.
2010/0306765 A1 12/2010 Dehaan
2010/0306767 A1 12/2010 Dehaan
2010/0318609 A1 12/2010 Lahiri et al.
2010/0332262 A1 12/2010 Horvitz et al.
2010/0332629 A1 12/2010 Cotugno et al.
2010/0333087 A1 12/2010 Vaidyanathan et al.
2011/0004566 A1 1/2011 Berkowitz et al.
2011/0016214 A1 1/2011 Jackson
2011/0029969 A1 2/2011 Venkataraja et al.
2011/0029970 A1 2/2011 Arasaratnam
2011/0047315 A1 2/2011 De Dinechin et al.
2011/0055377 A1 3/2011 Dehaan
2011/0055396 A1 3/2011 Dehaan
2011/0055398 A1 3/2011 Dehaan et al.
2011/0078303 A1 3/2011 Li et al.
2011/0107332 A1 5/2011 Bash
2011/0131306 A1 6/2011 Ferris et al.
2011/0131329 A1 6/2011 Kaplinger et al.
2011/0131589 A1 6/2011 Beaty et al.
2011/0138382 A1 6/2011 Hauser et al.
2011/0138441 A1 * 6/2011 Neystadt et al. .................. 726/1
2011/0145392 A1 6/2011 Dawson et al.
2011/0153724 A1 6/2011 Raja et al.
2011/0161952 A1 6/2011 Poddar et al.
2011/0173470 A1 7/2011 Tran
2011/0179132 A1 7/2011 Mayo et al.
2011/0179134 A1 7/2011 Mayo et al.
2011/0179162 A1 7/2011 Mayo et al.
2011/0185063 A1 7/2011 Head et al.
2011/0219372 A1 9/2011 Agrawal et al.
2011/0270968 A1 11/2011 Salsburg et al.
2011/0276951 A1 11/2011 Jain
2011/0296021 A1 12/2011 Dorai et al.
2011/0302378 A1 12/2011 Siebert
2011/0302583 A1 12/2011 Abadi et al.
2011/0320520 A1 12/2011 Jain
2012/0017210 A1 1/2012 Huggins et al.
2012/0054742 A1 3/2012 Eremenko et al.
2012/0060172 A1 3/2012 Abouzour
2012/0066682 A1 3/2012 Al-Aziz et al.
2012/0079480 A1 3/2012 Liu
2012/0089980 A1 4/2012 Sharp et al.
2012/0124211 A1 5/2012 Kampas et al.
2012/0131156 A1 * 5/2012 Brandt et al. ................. 709/221
2012/0131591 A1 5/2012 Moorthi et al.
2012/0159507 A1 6/2012 Kwon et al.
2012/0167081 A1 6/2012 Sedayao et al.
2012/0173709 A1 7/2012 Li et al.
2012/0179874 A1 7/2012 Chang et al.
2012/0185913 A1 * 7/2012 Martinez et al. .................. 726/1
2012/0198442 A1 8/2012 Kashyap et al.
2012/0204176 A1 8/2012 Tian et al.
2012/0221845 A1 8/2012 Ferris
2012/0233315 A1 9/2012 Hoffman et al.
2012/0233626 A1 9/2012 Hoffman et al.
2012/0246517 A1 9/2012 Bender et al.
2012/0266231 A1 * 10/2012 Spiers et al. .................... 726/12
2012/0284714 A1 11/2012 Venkitachalam et al.
2012/0303773 A1 11/2012 Rodrigues
2012/0311012 A1 12/2012 Mazhar et al.
2013/0042115 A1 * 2/2013 Sweet et al. ................. 713/176
2013/0060946 A1 3/2013 Kenneth et al.
2013/0067067 A1 3/2013 Miri et al.
2013/0081016 A1 3/2013 Saito et al.
2013/0086590 A1 4/2013 Morris et al.
2013/0129068 A1 5/2013 Lawson et al.
2013/0132057 A1 5/2013 Deng et al.
2013/0169666 A1 7/2013 Pacheco et al.
2013/0173803 A1 7/2013 Pijewski et al.
2013/0179881 A1 7/2013 Calder et al.
2013/0191835 A1 7/2013 Araki
2013/0191836 A1 7/2013 Meyer; John J.
2013/0254407 A1 9/2013 Pijewski et al.
2013/0318525 A1 11/2013 Palanisamy et al.
2013/0328909 A1 12/2013 Pacheco et al.
2013/0339966 A1 12/2013 Meng et al.
2013/0346974 A1 12/2013 Hoffman et al.
2014/0279955 A1 9/2014 Cavage et al.
2014/0280198 A1 9/2014 Cavage et al.
2014/0280796 A1 9/2014 Pijewski
2014/0280912 A1 9/2014 Gregg
2014/0280970 A1 9/2014 Pijewski et al.

(56) References Cited

U.S. PATENT DOCUMENTS

| | | | |
|---|---|---|---|
| 2014/0281304 | A1 | 9/2014 | Hoffman |
| 2014/0282512 | A1 | 9/2014 | Pacheco et al. |
| 2014/0282513 | A1 | 9/2014 | Pacheco et al. |
| 2014/0282590 | A1 | 9/2014 | Cavage et al. |
| 2014/0282615 | A1 | 9/2014 | Cavage et al. |

OTHER PUBLICATIONS

Chappell, David. "Introducing Windows Azure". Microsoft Corporation. Oct. 2010. pp. 1-25.

Yagoubi, Belabbas et al., "Load Balancing in Grid Computing," Asian Journal of Information Technology, vol. 5, No. 10 , pp. 1095-1103, 2006.

Kramer, "Advanced Message Queuing Protocol (AMQP)," Linux Journal, Nov. 2009, p. 1-3.

Subramoni et al., "Design and Evaluation of Benchmarks for Financial Applications Using Advanced Message Queuing Protocol (AMQP) over InfiniBand," Nov. 2008.

Richardson et al., "Introduction to RabbitMQ," Sep. 2008, p. 1-33.

Bernstein et al., "Using XMPP as a Transport in Intercloud Protocols," Jun. 22, 2010, p. 1-8.

Bernstein et al., "Blueprint for the Intercloud—Protocols and Formats for Cloud Computing Interoperabiilty," May 28, 2009, p. 328-336.

Gregg, Brendan, "Visualizing System Latency," May 1, 2010, ACM Queue, p. 1-13, http://queue.acm.org/detail.cfm?id=1809426.

Gregg, Brendan, "Heat Map Analytics," Mar. 17, 2009, Oracle, p. 1-7, https://blogs.oracle.com/brendan/entry/heat_map_analytics.

Mundigl, Robert, "There is More Than One Way to Heat a Map," Feb. 10, 2009, Clearly and Simply, p. 1-12, http://www.clearlyandsimply.com/clearly_and_simply/2009/02/there-is-more-than-one-way-to-heat-a-map.html.

International Search Report and Written Opinion of the International Searching Authority mailed May 5, 2011 in Patent Cooperation Treaty Application No. PCT/US2011/028230, filed Mar. 12, 2011.

Chef Documents. Retrieved Mar. 11, 2014 from http://docs.opscode.com/.

Ansible Documentation. Retrieved Mar. 11, 2014 from http://docs.ansible.com/.

Block IO Controller. Retrieved Mar. 12, 2014 from https://www.kernel.org/doc/Documentation/cgroups/blkio-controller.txt.

Block Device Bio Throttling Support. Retrieved Mar. 12, 2014 from https://lwn.net/Articles/403889/.

I/O throttling, Michael Mesnier, 2006.

Bill Pijewski's Blog. Retrieved Mar. 12, 2014 from http://dtrace.org/blogs/wdp/2011/03/our-zfs-io-throttle/.

Brendan's Blog. Retrieved Mar. 12, 2014 from http://dtrace.org/blogs/brendan/2011/03/08/busy-week-zfs-throttling-dtrace-node-js-and-cloud-analytics/.

Joyent ZFS Performance Analysis and Tools. Retrieved Mar. 12, 2014 from http://www.slideshare.net/brendangregg/zfsperftools2012.

Gregg, Brendan. Systems Performance: Enterprise and the Cloud, Prentice Hall, 2014, pp. 557-558.

International Search Report and Written Opinion of the International Searching Authority mailed Sep. 1, 2011 in Patent Cooperation Treaty Application No. PCT/US2011/021157 filed Jan. 13, 2011.

International Search Report and Written Opinion of the International Searching Authority mailed May 19, 2011 in Patent Cooperation Treaty Application No. PCT/US2011/028234 filed Mar. 11, 2011.

* cited by examiner

SYSTEMS AND METHODS FOR ZONE-BASED INTRUSION DETECTION

BACKGROUND

1. Technical Field

Some embodiments of the disclosure relate to the management of cloud-based computing environments. Systems, methods, and media provided herein may be utilized for zone-based intrusion detection in a cloud computing environment.

2. Description of Related Art

A cloud is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo! ™, or such systems may be accessible to outside users who deploy applications within the computing infrastructure to obtain the benefit of large computational or storage resources.

The cloud may be formed, for example, by a network of web servers with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations may depend on the type of business associated with the user. Hackers sometimes try to compromise computer systems, including cloud-based systems. It would be desirable to provide security and prevent this from occurring.

SUMMARY OF THE INVENTION

According to some embodiments, the present technology may be directed to system and methods for zone-based intrusion detection. The system may comprise a multi-tenant system; a server communicatively coupled with the multi-tenant system; a zone-based intrusion detection module running on the server; a zone within the server, the zone being a tenant and including at least one process running on it; and a debugger module that examines the process in real-time. The system may comprise a multi-tenant system; a server communicatively coupled with the multi-tenant system; a zone-based intrusion detection system (ZIDS) module running on the same server (or system) as a target tenant and residing in a global zone and immune from compromise by a target tenant, the ZIDS module directly inspects a target tenant running one or more processes; a zone within the server, the zone being a tenant and including at least one process running on it; and a debugger module that examines the process in real-time.

DETAILED DESCRIPTION OF THE INVENTION

Figure 1:
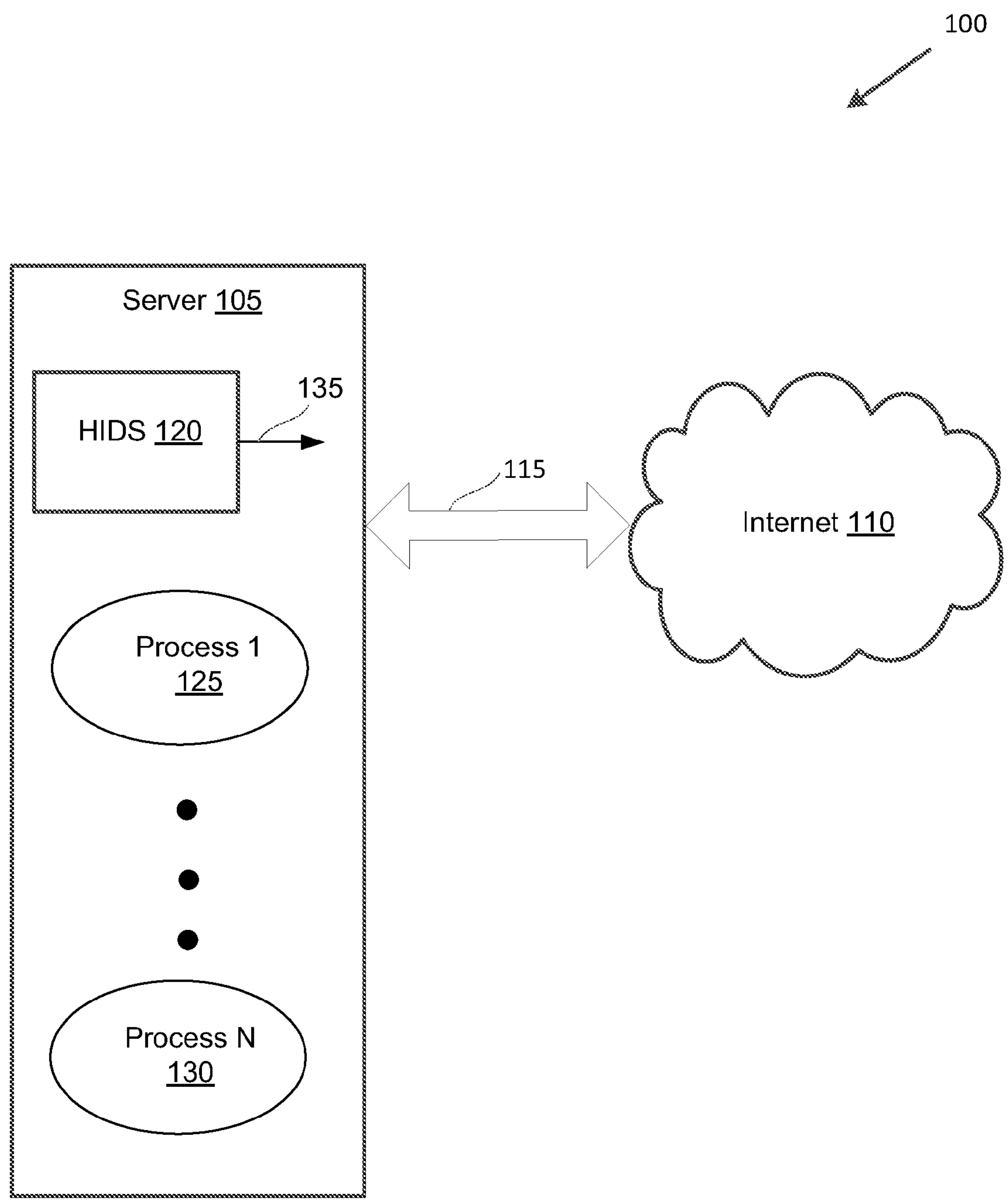
FIG. 1 is a block diagram of an exemplary architecture of a HIDS system.

Before explaining the presently disclosed and claimed inventive concept(s) in detail by way of exemplary embodiments, drawings, and appended claims, it is to be understood that the present disclosure is not limited in its application to the details of construction and the arrangement of the components set forth in the following description or illustrated in the drawings. The present disclosure is capable of other embodiments or of being practiced or carried out in various ways. As such, the language used herein is intended to be given the broadest possible scope and meaning; and the embodiments are meant to be exemplary—not exhaustive. It is to be understood that the phraseology and terminology employed herein is for the purpose of description and should not be regarded as limiting. Unless otherwise required by context, singular terms may include pluralities and plural terms may include the singular.

It is desirable to be able to detect that a cloud instance has been compromised by hackers (crackers). It is important to identify suspicious activity. For example, a site could be being used for something nefarious. This should be identified and checked. Once a system is compromised, it may be used for piracy, dissemination of credit card numbers, or numerous other illegal activities.

FIG. 1 is a block diagram of an exemplary architecture of a host-based intrusion detection (HIDS) system 100. A server 105 is communicatively coupled with a network, such as Internet 110, via a network connection 115. Running on the server 105 is a HIDS module 120 for detecting intrusions. Also running on the server 105 are one or more processes, such as process 1 125 through process N 130. Various information stores and/or communications, such as logs 135, may be made.

In HIDS system 100, one runs software on the server that monitors for malicious activity and inspects processes. If a server is compromised, an attacker can then interfere with the HIDS monitoring software. If a hacker performs a privilege escalation attack and become a "super user," he could modify the HIDS software so that it does not record his illegal activities. The hacker could delete the log or change the log etc.

This becomes a problem when one is trying to use this as evidence in a court of law because an individual cannot guarantee nonrepudiation. For HIDS, an exemplary known good quantity is a separate read-only CD ROM. There is not a known good quality within the server—the whole server may be compromised. After a detection of illegal activity, law enforcement should present evidence that one knows is not tainted. In some other systems one cannot say tools have not been compromised unless one produces an evidence bag with the CD ROM used for analysis.

Generally, HIDS can be more effective at identifying malicious activity than a network-based intrusion detection system (NIDS; discussed herein). This is software one runs on one's system to identify suspicious activity. This is better because one has the context of the applications. In other words, one may monitor what the applications are doing with respect to the operating system, their running software, as well as the network to identify suspicious activity. NIDS falls victim to the problem that hackers encrypt traffic/packets often. However, on the host HIDS can detect this encryption, and can examine activity after decryption. One problem with HIDS, and what the present technology (ZIDS, discussed herein) solves, is that the HIDS software is vulnerable to being compromised. Hackers call this "root kits"—when one installs software on a system with nefarious versions that lie to you. One then cannot run commands on a system because the commands themselves may be compromised. Law enforcement has the problem that evidence may be tainted. Thus, law enforcement uses what is called a "known to be good" CD ROM containing trusted analysis tools, boots a server from this CD ROM and runs software from it to examine the hard disks. This is providing what is known in the art as nonrepudiation.

Figure 2:
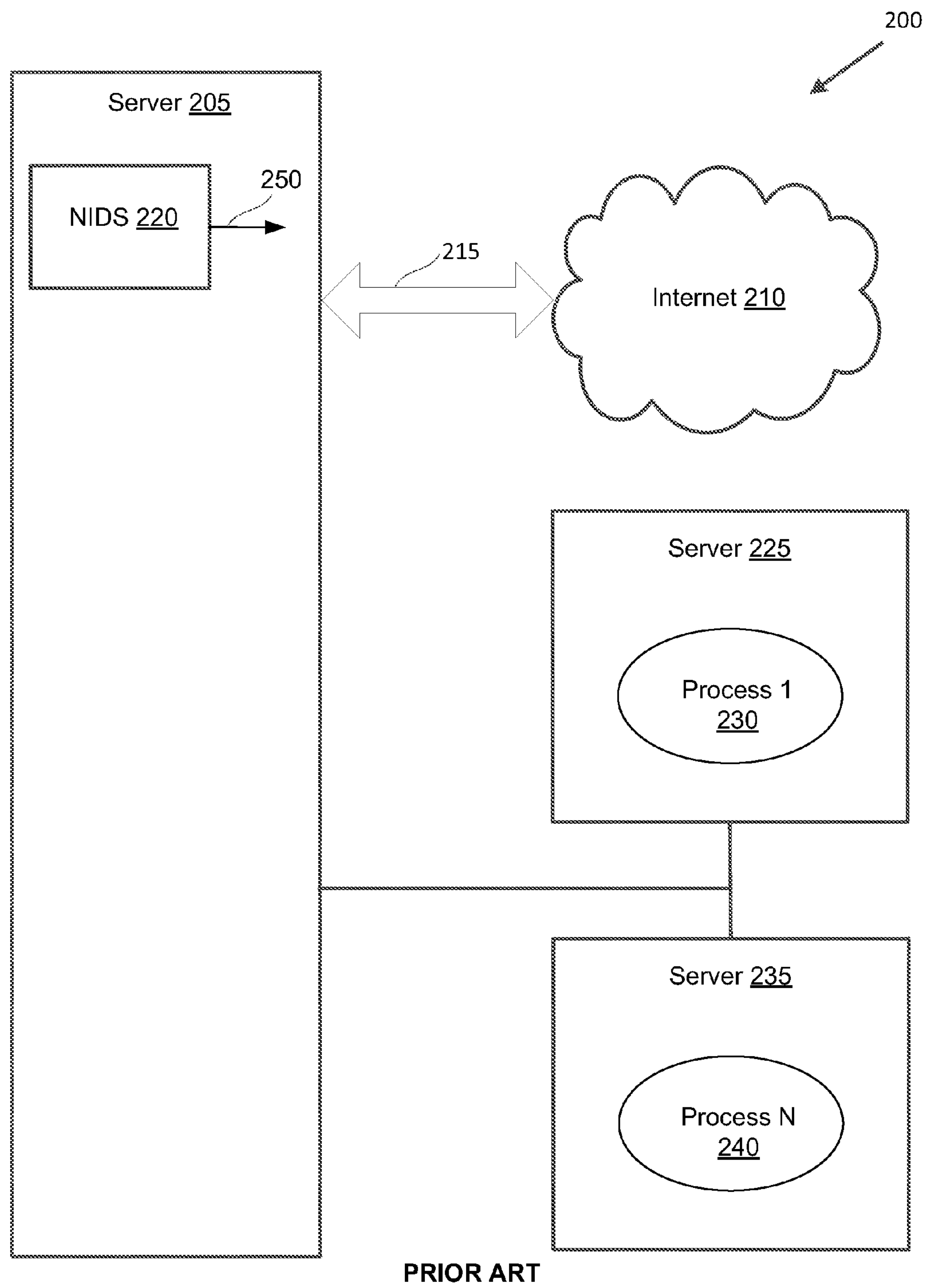
FIG. 2 is a block diagram of an exemplary architecture of a NIDS system.

FIG. 2 is a block diagram of an exemplary architecture of a network-based intrusion detection (NIDS) system 200. A server 205 is communicatively coupled with a network, such as Internet 210, via a network connection 215. Running on the server 205 is a NIDS module 220 for detecting intrusions. One or more servers, such as a server 225 and a server 235, may be communicatively coupled with the server 205. Running on the server 225 and the server 235 are process 1 230 and process N 240, respectively. Various information stores and/or communications, such as logs 250, may be made. NIDS works by sniffing network packets, and has disadvantages mentioned herein.

NIDS is usually a separate dedicated server that connects to the network. This makes the NIDS secure, because if someone compromises a target server, and uses what is known in the art as a privilege escalation attack, they have no direct access to compromise the NIDS system itself, which is separate. However, since NIDS can only look at network packets, it misses out on a lot of context. One does not get to see what processes are doing, and one does not get to see plaintext (the decrypted/decompressed version of the data packets/traffic). Therefore, as a means for defeating NIDS, hackers tend to encrypt their malware on the network to make it more difficult to identify—because the NIDS cannot decrypt the encrypted packets. NIDS is secure but it has limited observability.

Figure 3:
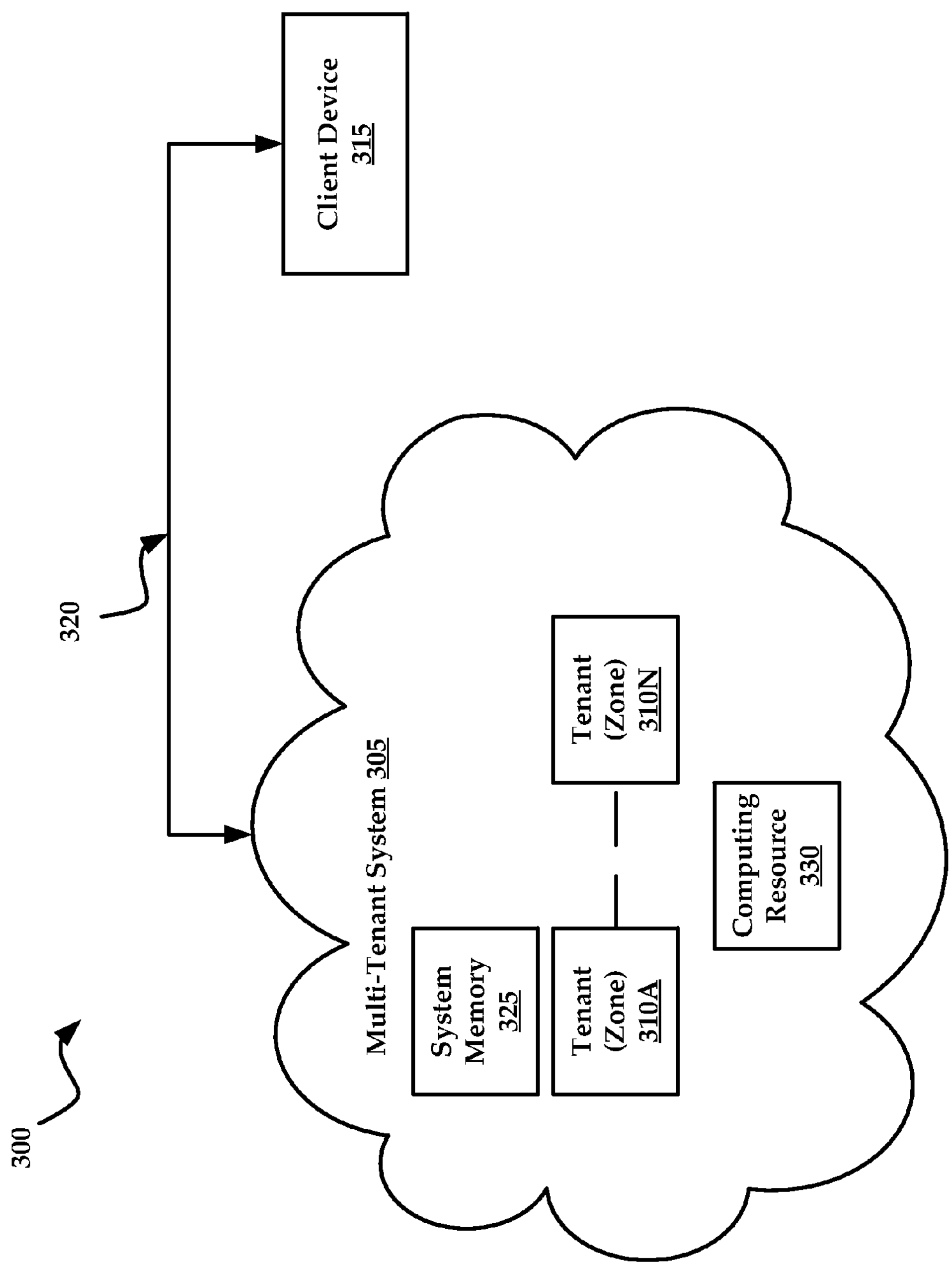
FIG. 3 illustrates an exemplary system for practicing aspects of the present technology.

FIG. 3 illustrates an exemplary system 300 for practicing aspects of the present technology. In some embodiments, the present technology may be utilized in multi-tenant systems. Multi-tenant systems may impose dynamic and drastically varying workloads on computing resources of a cloud. The term multi-tenant may be understood to include not only cloud environments, but also other configurations of computing devices/resources, such as an enterprise system that may have both primary and secondary computing resources.

The present technology may employ a software virtualized solution within a cloud platform, wherein each tenant is a container built into the underlying operating system of the cloud. The present technology may provision a tenant (also known as a zone) for each customer, and this architecture grants the system additional flexibility when allocating resources to individual tenants. The present technology may observe the activity of all tenants, and can coordinate with the kernel of the cloud to optimize resource management between tenants.

The system 300 may include a multi-tenant system 305 that may include a cloud-based computing environment. As stated herein, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo! ™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In some embodiments, the cloud includes a plurality of tenants 310A-N (e.g., zones), where each tenant may represent a virtual computing system for a customer. Each tenant may be configured to perform one or more computing operations such as hosting a web page, enabling a web-based application, facilitating data storage, and so forth.

In other embodiments, the multi-tenant system 305 may include a distributed group of computing devices such as web servers that do not share computing resources or workload. Additionally, the multi-tenant system 305 may include a single computing device that has been provisioned with a plurality of programs that each produce instances of event data.

The multi-tenant system 305 may provide the tenants 310A-N with a plurality of computing resources, which may be either virtual or physical components, for example system memory 325. For the purposes of brevity, the following description may specifically describe a computing resource 330 that includes a physical storage media such as a hard disk.

Customers or system administrators may utilize client devices 315 to access their tenant within the multi-tenant system 305. Additionally, the individual parts of the system 300 may be communicatively coupled with one another via a network connection 320. The network connection may include any number or combination of private and/or public communications media, such as the Internet.

Figure 4:
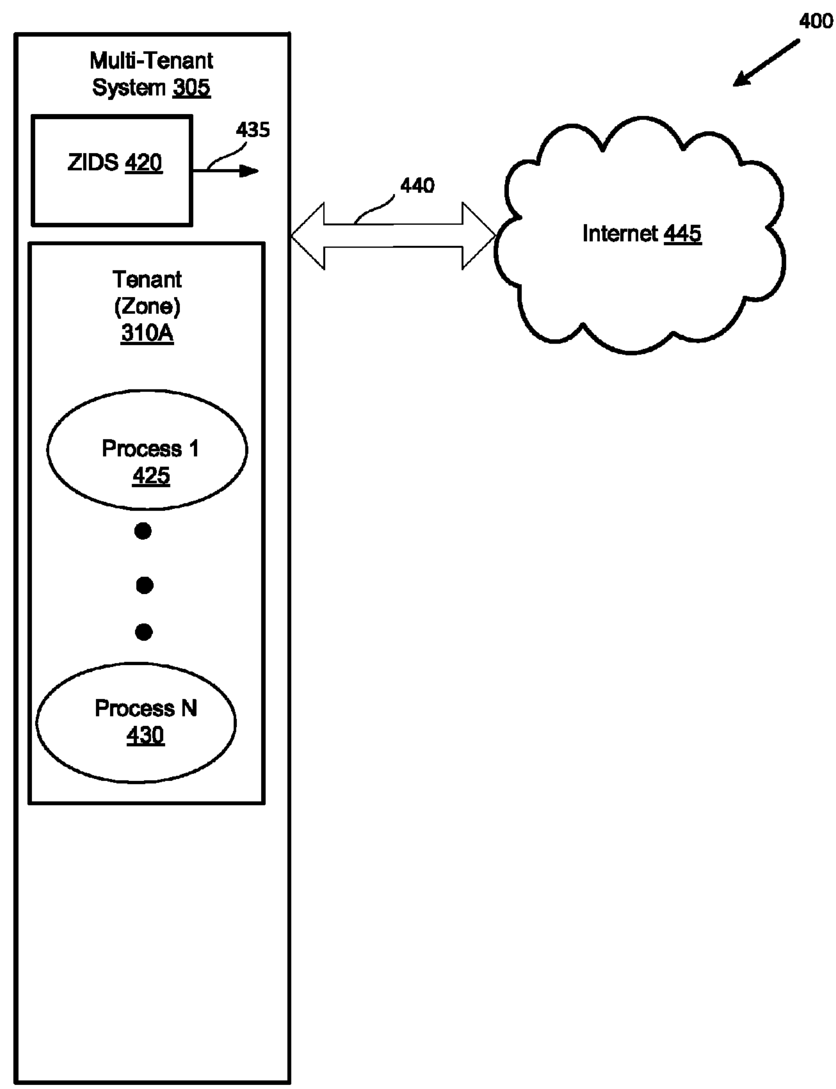
FIG. 4 is a block diagram of an exemplary architecture of a ZIDS system that may be used to practice aspects of the present disclosure.

FIG. 4 is a block diagram of an exemplary architecture of a zone-based intrusion detection (ZIDS) system 400, according to some embodiments of the present technology. The multi-tenant system 305 (or other server) is communicatively coupled with a network, such as the Internet 445, via a network connection 440. Running on the multi-tenant system 305 is a ZIDS module 420 for detecting intrusions. Also running on the multi-tenant system 305 are one or more processes, such as process 1 425 through process N 430, within tenant (zone) 310A. Various information stores and/or communications, such as logs 435, may be made.

A global zone with visibility exists for the tenants within ZIDS. One may use debugger tools like DTrace to look at system events. With ZIDS, a tenant may be compromised, but the hacker will have no means to escalate to the global zone and compromise the tools that one uses to inspect. Therefore, one has a live (one may examine an application while it is still running) known to be good (known to be uncompromised) environment (global zone) from which to inspect the tenants. One is not required to power down the system and then boot from a CD ROM with use "known to be good" tools. One has non-repudiation with ZIDS, while the system is still running. The tenant may be infected but the hacker cannot install a root kit in the global zone. A kernel has no means to escalate from the tenant to the global zone. There is a known to be good area. One is running one's known good observability in a good area with ZIDS.

In a normal system of the prior art, one cannot say tools were not compromised unless one has evidence bag with a CD ROM, as mentioned herein. With ZIDS, however, one can say the tools were definitively in the global zone. One can assure the global zone tools were not compromised. There is no path to them provided by the operating system from the tenant context.

If one were to boot of a CD ROM and perform forensics, it would be a static process. Advantageously ZIDS watches processes live as they make network connections. HIDS can watch live traffic but can be compromised.

ZIDS is the first known good nonrepudiation environment that can monitor live traffic from within the server. This is important because if one tries to do this from the network, packets/traffic may be encrypted. DTrace (dynamic tracing—not static) allows one to inspect software in real time without stopping the software. One may trace the execution of the software's functions, etc. When a hacker encrypts malware to evade detection, it ultimately has to be decrypted or decompressed before running, and DTrace can detect it. Advantages include real-time analysis (e.g., process inspection), nonrepudiation because you are known to be in a good global zone, deep visibility (e.g., using DTrace to look at plaintext of malware and doing this from a real-time nonrepudiation environment), and the fact that zones have one-way access (once in a zone there is no breaking out).

ZIDS embodies the best of both worlds. With ZIDS, one can see exactly what the process is doing, see plaintext, and can also have security since there are only a few code paths that change authorization. Processes within a zone are basically within their own isolated jail. If you break out of the process, you find out you are in a secure jail. The ZIDS for which one may use DTrace cannot be interfered with because it is in its own secure environment and so it provides nonrepudiation, it is secure, and it provides all the context and deep details.

It is noteworthy that in the various figures that show IDS components, there may be a local log ("local" meaning it is on the same server as the IDS software). An important point is whether the IDS could be compromised by an attacker (as is the case with HIDS, but not NIDS or ZIDS), and a secondary point is whether the log could also be compromised (again, it can be with HIDS, but it cannot be with NIDS or ZIDS). It should be mentioned that a local log is only one of multiple means of reporting for IDS. The system may also send alerts (e.g., e-mail or SMS), or, write to a remote log on another system, some of which solve the HIDS local log problem.

As used herein, the term "compromised" means the attacker is compromising the target system, which is running the application (e.g., database) of interest. Obviously, if that same system is running a HIDS, then the attacker can interfere with the HIDS software. With NIDS and ZIDS, the target system has no access to the IDS software, so there is no path from a compromised target system to compromising the IDS. However, it should be noted that attacking the NIDS system or the ZIDS global zone directly is much more difficult for the attacker (both NIDS and ZIDS can be made much more secure than the application systems; for example, they usually do not need an Internet address, so there is no publicly facing target to begin with; another point is that many attacks exploit vulnerabilities in the applications, like databases, which are not running on the NIDS or ZIDS systems).

Figure 5:
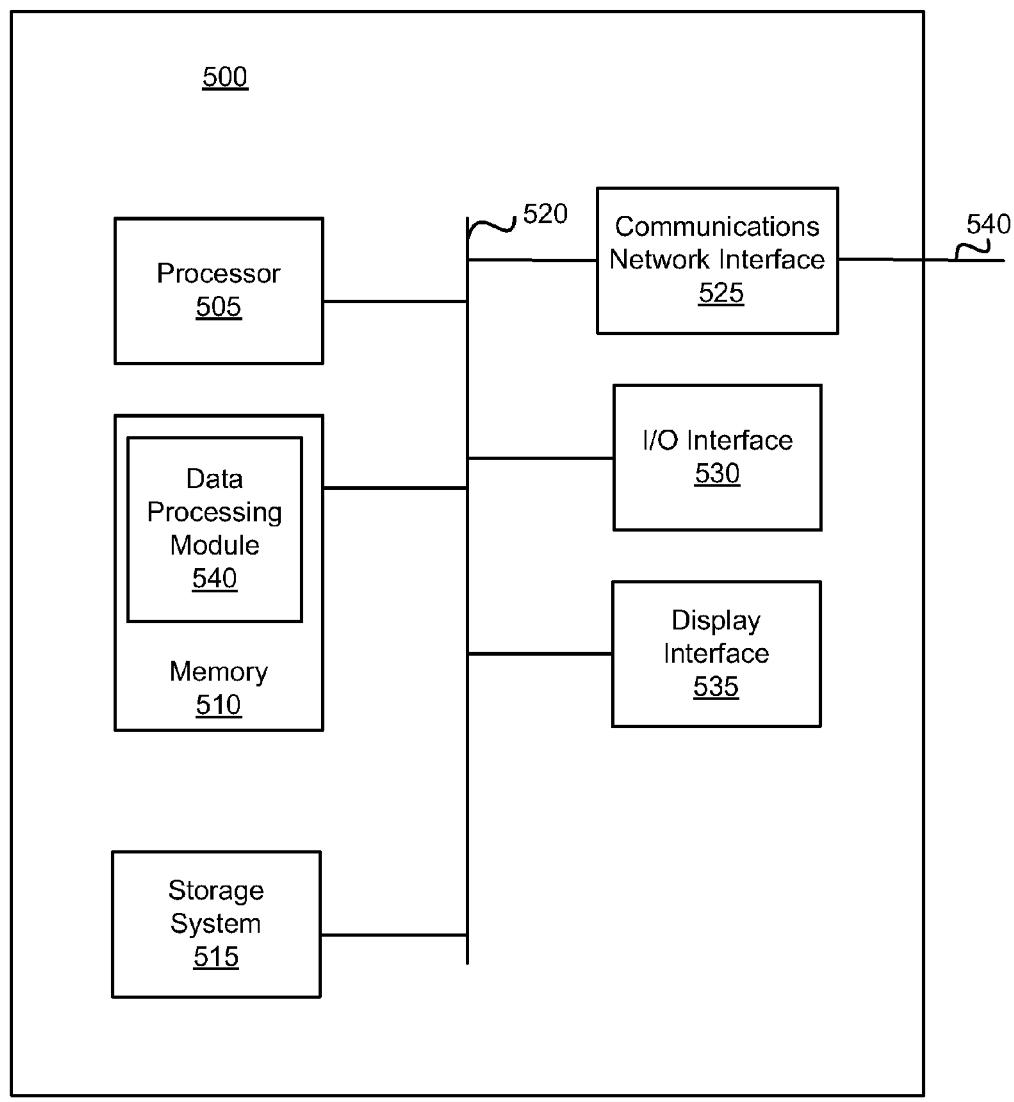
FIG. 5 is a block diagram of exemplary system for practicing embodiments according to the present disclosure.

Referring now to FIG. 5, shown therein is a block diagram of exemplary system 500 for practicing embodiments according to the present technology.

The system 500 of FIG. 5 may include one or more processors 505 and memory 510. The memory 510 may store, in part, instructions and data for execution by the processor 505. The memory 510 may store executable code when in operation. The memory 510 may include a data processing module 540 for processing data. The system 500 may further include a storage system 515, communication network interface 525, input and output (I/O) interface(s) 530, and display interface 535.

The components shown in FIG. 5 are depicted as being communicatively coupled via a bus 520. The components may be communicatively coupled via one or more data transport means. The processor 505 and memory 510 may be communicatively coupled via a local microprocessor bus, and the storage system 515 and display interface 535 may be communicatively coupled via one or more input/output (I/O) buses. The communications network interface 525 may communicate with other digital devices (not shown) via a communications medium.

The storage system 515 may include a mass storage device and portable storage medium drive(s). The mass storage device may be implemented with a magnetic disk drive or an optical disk drive, which may be a non-volatile storage device for storing data and instructions for use by the processor 505. The mass storage device can store system software for implementing embodiments according to the present technology for purposes of loading that software into the memory 510. Some examples of the memory 510 may include RAM and ROM.

A portable storage device, as part of the storage system 515, may operate in conjunction with a portable non-volatile storage medium, such as a floppy disk, compact disk or digital video disc (DVD), to input and output data and code to and from the system 500 of FIG. 5. System software for implementing embodiments of the present invention may be stored on such a portable medium and input to the system 500 via the portable storage device.

The memory and storage system of the system 500 may include a non-transitory computer-readable storage medium having stored thereon instructions executable by a processor to perform a method for determining a reduced-risk word price. The instructions may include software used to implement modules discussed herein, and other modules.

I/O interfaces 530 may provide a portion of a user interface, receive audio input (via a microphone), and provide audio output (via a speaker). The I/O interfaces 530 may include an alpha-numeric keypad, such as a keyboard, for inputting alpha-numeric and other information, or a pointing device, such as a mouse, trackball, stylus, or cursor direction keys.

The display interface 535 may include a liquid crystal display (LCD) or other suitable display device. The display interface 535 may receive textual and graphical information, and process the information for output to the display interface 535.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "non-transitory computer-readable storage medium" and "non-transitory computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, DVD, any other optical medium, any other physical medium with patterns of marks or holes, a RAM, a PROM, an EPROM, an EEPROM, a flash EEPROM, a non-flash EEPROM, any other memory chip or cartridge, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

An exemplary computing system may be used to implement various embodiments of the systems and methods disclosed herein. The computing system may include one or more processors and memory. The memory may include a computer-readable storage medium. Common forms of computer-readable storage media include, for example, a floppy disk, a flexible disk, a hard disk, magnetic tape, any other magnetic medium, a CD-ROM disk, DVD, various forms of volatile memory, non-volatile memory that can be electrically erased and rewritten. Examples of such non-volatile memory include NAND flash and NOR flash and any other optical medium, the memory is described in the context of. The memory can also comprise various other memory technologies as they become available in the future.

Main memory stores, in part, instructions and data for execution by a processor to cause the computing system to control the operation of the various elements in the systems described herein to provide the functionality of certain embodiments. Main memory may include a number of memories including a main random access memory (RAM) for storage of instructions and data during program execution and a read only memory (ROM) in which fixed instructions are stored. Main memory may store executable code when in operation. The system further may include a mass storage device, portable storage medium drive(s), output devices, user input devices, a graphics display, and peripheral devices. The components may be connected via a single bus. Alternatively, the components may be connected via multiple buses. The components may be connected through one or more data transport means. Processor unit and main memory may be connected via a local microprocessor bus, and the mass storage device, peripheral device(s), portable storage device, and display system may be connected via one or more input/output (I/O) buses.

Mass storage device, which may be implemented with a magnetic disk drive or an optical disk drive, may be a non-volatile storage device for storing data and instructions for use by the processor unit. Mass storage device may store the system software for implementing various embodiments of the disclosed systems and methods for purposes of loading that software into the main memory. Portable storage devices may operate in conjunction with a portable non-volatile storage medium, such as a floppy disk, compact disk or DVD, to input and output data and code to and from the computing system. The system software for implementing various embodiments of the systems and methods disclosed herein may be stored on such a portable medium and input to the computing system via the portable storage device.

Input devices may provide a portion of a user interface. Input devices may include an alpha-numeric keypad, such as a keyboard, for inputting alpha-numeric and other information, or a pointing device, such as a mouse, a trackball, stylus, or cursor direction keys. In general, the term input device is intended to include all possible types of devices and ways to input information into the computing system. Additionally, the system may include output devices. Suitable output devices include speakers, printers, network interfaces, and monitors. Display system may include a liquid crystal display (LCD) or other suitable display device. Display system may receive textual and graphical information, and processes the information for output to the display device. In general, use of the term output device is intended to include all possible types of devices and ways to output information from the computing system to the user or to another machine or computing system.

Peripherals may include any type of computer support device to add additional functionality to the computing system. Peripheral device(s) may include a modem or a router or other type of component to provide an interface to a communication network. The communication network may comprise many interconnected computing systems and communication links. The communication links may be wireline links, optical links, wireless links, or any other mechanisms for communication of information. The components contained in the computing system may be those typically found in computing systems that may be suitable for use with embodiments of the systems and methods disclosed herein and are intended to represent a broad category of such computing components that are well known in the art. Thus, the computing system may be a personal computer, hand held computing device, telephone, mobile computing device, workstation, server, minicomputer, mainframe computer, or any other computing device. The computer may also include different bus configurations, networked platforms, multi-processor platforms, etc.

Various operating systems may be used including SmartOS, Unix, Linux, Windows, Macintosh OS, Palm OS, and other suitable operating systems. Due to the ever changing nature of computers and networks, the description of the computing system is intended only as a specific example for purposes of describing embodiments. Many other configurations of the computing system are possible having more or fewer components.

It is noteworthy that various modules and engines may be located in different places in various embodiments. Modules and engines mentioned herein can be stored as software, firmware, hardware, as a combination, or in various other ways. It is contemplated that various modules and engines can be removed or included in other suitable locations besides those locations specifically disclosed herein. In various embodiments, additional modules and engines can be included in the exemplary embodiments described herein.

The foregoing detailed description of the technology herein has been presented for purposes of illustration and description. It is not intended to be exhaustive or to limit the technology to the precise form disclosed. Many modifications and variations are possible in light of the above teaching. For example, software modules and engines discussed herein may be combined, expanded into multiple modules and engines, communicate with any other software module(s) and engine(s), and otherwise may be implemented in other configurations. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for zone-based intrusion detection, the method comprising:

providing a cloud-based multi-tenant system, wherein each tenant of the multi-tenant system represents a virtual computing system within a zone of the cloud for a customer;

providing a server communicatively coupled to the tenants within the multi-tenant system; and providing a zone-based intrusion detection system (ZIDS) module running on the server that is configured for:

monitoring unencrypted live traffic in each zone from within the server, analyzing and executing processes in real time in each zone, and detecting zone-based intrusion for each tenant of the cloud-based multi-tenant system based on the monitored live traffic, an inspected software, and the analyzed process.

2. The method of claim 1, wherein the ZIDS module is running on the same system as the tenants of the multi-tenant system.

3. The method of claim 1, wherein the ZIDS module resides in a global zone and is immune from compromise from the tenants of the multi-tenant system.

4. The method of claim 1, wherein the ZIDS module directly inspects the tenants of the multi-tenant system running one or more processes.

5. The method of claim 1, wherein providing the zone within the server includes providing the tenant of the multi-tenant system within the server.

6. The method of claim 1, wherein at least one process is running on the zone.

7. The method of claim 1, further comprising using a debugger module to examine a process in real-time.

8. The method of claim 7, wherein the debugger module is DTrace.

9. The method of claim 1, wherein the zone has one-way access only.

10. The method of claim 1, wherein the ZIDS module writes to a log.

11. The method of claim 1, wherein the ZIDS module sends e-mails.

12. A system for zone-based intrusion detection, the system comprising:

a processing system having instructions stored on non-transitory computer-readable storage medium that when executed cause the processing system to:

provide a cloud-based multi-tenant system, wherein each tenant of the multi-tenant system represents a virtual computing system within a zone of the cloud for a customer;

provide a server communicatively coupled to the tenants within the multi-tenant system; and provide a zone-based intrusion detection system (ZIDS) module running on the server that is configured for:

monitoring unencrypted live traffic in each zone from within the server, analyzing and executing processes in real time in each zone, and detecting zone-based intrusion based on the monitored live traffic, an inspected software, and the analyzed process, for each tenant of the cloud-based multi-tenant system, the ZIDS module and the server residing in a global zone that cannot be compromised by any tenant of the multi-tenant system.

13. The system of claim 12, wherein the ZIDS module is running on the same system as the tenants of the multi-tenant system.

14. The system of claim 12, wherein the ZIDS module resides in the global zone and is immune from compromise from the tenants of the multi-tenant system.

15. The system of claim 12, wherein the ZIDS module directly inspects the tenants of the multi-tenant system running one or more processes.

16. The system of claim 12, wherein at least one of the zones is at least one of the tenants.

17. The system of claim 12, wherein the zone includes at least one process running on it.

18. The system of claim 12, further comprising a debugger module that examines a process in real-time.

19. The system of claim 18, wherein the debugger module is DTrace.

20. A system for zone-based intrusion detection, the system comprising:

a cloud-based multi-tenant system, wherein each tenant of the multi-tenant system represents a virtual computing system within a zone of the cloud for a customer, and further wherein each tenant is a container built into an operating system of the cloud-based multi-tenant system;

a server communicatively coupled to the tenants within the multi-tenant system; and a zone-based intrusion detection system (ZIDS) module running on the server that is configured for:

monitoring unencrypted live traffic in each zone from within the server, analyzing and executing processes in real time in each zone, and detecting zone-based intrusion for each tenant of the cloud-based multi-tenant system based on the monitored live traffic, an inspected software, and the analyzed process.

21. The system of claim 20, wherein the ZIDS module is running on the same system as the tenant of the multi-tenant system.

22. The system of claim 20, wherein the ZIDS module resides in a global zone and is immune from compromise from the tenants of the multi-tenant system.

23. The system of claim 20, wherein the ZIDS module directly inspects the tenants of the multi-tenant system running one or more processes.

24. The system of claim 20, at least one of the zones is at least one of the tenants.

25. The system of claim 20, wherein the zone includes at least one process running on it.

26. The system of claim 20, further comprising a debugger module that examines a process in real-time.

27. The system of claim 26, wherein the debugger module is DTrace.

28. A system for zone-based intrusion detection, the system comprising:

a cloud-based multi-tenant system, wherein each tenant of the multi-tenant system represents a virtual computing system within a zone of the cloud for a customer;

a server communicatively coupled to the tenants within the multi-tenant system; and a zone-based intrusion detection system (ZIDS) module running on the same server as the tenants of the multi-tenant system and residing in a global zone and immune from compromise by the tenants of the multi-tenant system, the ZIDS module is configured for:

directly inspecting the tenants which are running one or more processes;

monitoring unencrypted live traffic in each zone from within the server;

executing processes in real time in each zone;

analyzing the executing processes using a debugger module; and detecting zone-based intrusion for each inspected tenant of the cloud-based multi-tenant system based on the monitored live traffic, an inspected software, and the analyzed processes.

* * * * *